United States Patent [19]

Gelderloos

[11] Patent Number: 4,691,525
[45] Date of Patent: Sep. 8, 1987

[54] METHOD OF OPERATING AN ABSORPTION HEAT PUMP OR REFRIGERATOR, AND AN ABSORPTION HEAT PUMP OR REFRIGERATOR

[75] Inventor: Pouwel J. Gelderloos, Ugchelen, Netherlands

[73] Assignee: Nederlandse Centrale Organisatie Voor Toegepast Natuurwetenschappelijk Onderzoek, Netherlands

[21] Appl. No.: 848,992

[22] Filed: Apr. 7, 1986

[30] Foreign Application Priority Data

Apr. 9, 1985 [NL] Netherlands ................. 8501039

[51] Int. Cl.$^4$ ............................................. F25B 15/00
[52] U.S. Cl. ..................................... 62/101; 62/141; 62/476; 62/486
[58] Field of Search ................. 62/101, 141, 476, 486

[56] References Cited

U.S. PATENT DOCUMENTS

| 4,270,365 | 6/1981 | Sampietro .................. 62/238.3 |
| 4,464,907 | 8/1984 | Mack et al. ................. 62/476 X |
| 4,561,259 | 12/1985 | Van der Sluys .................. 62/476 |

FOREIGN PATENT DOCUMENTS

| 0039545 | 11/1981 | European Pat. Off. . |
| 718956 | 3/1942 | Fed. Rep. of Germany . |
| 2854055 | 7/1980 | Fed. Rep. of Germany . |
| 3427763 | 2/1985 | Fed. Rep. of Germany . |
| 2539855 | 7/1984 | France . |
| WO82/03266 | 1/1982 | PCT Int'l Appl. . |
| 2002505A | 2/1979 | United Kingdom . |

OTHER PUBLICATIONS

Article by J. Kappel et al., in Brennstoff-Warme-Kraft, vol. 34, No. 1, Jan. 1982, entitled "EDV-gestützte Auslegung und Optimierung von Absorptionswärmepumpen."

*Primary Examiner*—Lloyd L. King
*Attorney, Agent, or Firm*—Brumbaugh, Graves, Donohue & Raymond

[57] ABSTRACT

A method of operating an absorption heat pump or refrigerator consisting at least of a refrigerant circuit and a refrigerant-containing solution circuit, with a generator for evaporating refrigerant from the solution with the supply of relatively high-temperature heat, a condenser for condensing refrigerant and giving up heat at an intermediate temperature level, an evaporator for evaporating refrigerant with the absorption of heat from a relatively cold heat source, a heat exchanger for transferring heat from the liquid passing out of the condenser to the refrigerant vapor and liquid coming from the evaporator, an absorber for absorbing refrigerant vapor into the solution with the giving-up of heat at an intermediate temperature level, and means for circulating the solution or maintaining the pressure, wherein the delivery of refrigerant is regulated in such a manner that the temperature differential $\Delta t_w$ between the liquid entering the heat exchanger on the condenser side and the liquid and vapor leaving the heat exchanger on the absorber side substantially coincides with the temperature differential $\Delta t_k$ between the liquid passing out of the heat exchanger on the evaporator side and the liquid and vapor entering the heat exchanger on the evaporator side. This four-temperature control system is very effective and results in an increase of the power of the apparatus. The invention further relates to an apparatus constructed to fulfill the above operating conditions.

10 Claims, 3 Drawing Figures fig-3
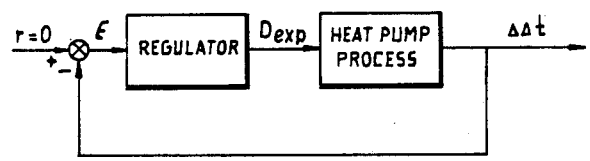
a  4- TEMPERATURE CONTROL
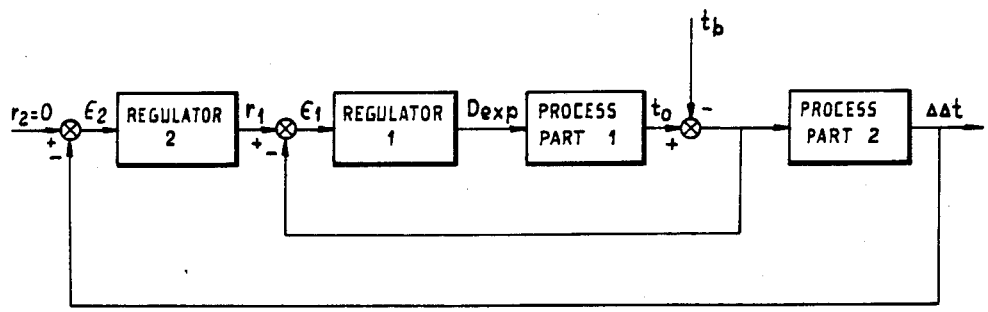
b  CASCADE CONNECTION OF DE $t_b-t_o-$ CONTROL AND 4-TEMPERATURE CONTROL.

METHOD OF OPERATING AN ABSORPTION HEAT PUMP OR REFRIGERATOR, AND AN ABSORPTION HEAT PUMP OR REFRIGERATOR

BACKGROUND OF THE INVENTION

The invention relates to a method of operating an absorption heat pump or refrigerator, consisting at least of a refrigerant circuit and a refrigerant-containing solution circuit, with a generator for evaporating refrigerant from the solution with the supply of relatively high-temperature heat, a condenser for condensing refrigerant and giving up heat at an intermediate temperature level, an evaporator for evaporating refrigerant with the absorption of heat from a relatively cold heat source, a heat exchanger for transferring heat from the liquid passing out of the condenser to the refrigerant vapour and liquid coming from the evaporator, an absorber for absorbing refrigerant vapour into the solution with the giving-up of heat at an intermediate temperature level, and means for circulating the solution or maintaining the pressure.

A method of this kind is known from Plank, R., "Handbuch der Kaltetechnik" (1959), Part VII, particularly pages 10 to 19. In the apparatus described there a heat exchanger, also referred to as an after-cooler, afterevaporator, or liquid cooler, can be included, in which condensate coming from the condeners is cooled by heating vapour and evaporating any entrained liquid. The action of this heat exchanger is described on page 13 and on pages 182 to 188 in the work referred to above. In an apparatus of the type first described above it is desired to achieve optimising regulation of the refrigerant flow ($D_{exp}$) via a throttle means to the evaporator in order to improve the performance of the apparatus. In the case of a heat pump the performance is measured by the heating effect output for a constant energy input, and in the case of a refrigerator the refrigerating effect for a constant generator power.

SUMMARY OF THE INVENTION

It has now been found that this power of the apparatus can be increased by applying a method of the type first described above, which is characterized in that the flow of refrigerant is regulated in such a manner that the temperature differential $\Delta t_w$ between the liquid entering the heat exchanger on the condenser side ($t_1$) and the liquid and vapour leaving the heat exchanger on the absorber side ($t_4$) substantially coincides with the temperature differential $\Delta t_k$ between the liquid passing out of the heat exchanger on the evaporator side ($t_2$) and the liquid and vapour entering the heat exchanger on the evaporator side ($t_3$).

This regulation will be referred to hereinbelow as four-temperature control. According to the four-temperature control of the method of the invention the heat ratio of the heat pump, that is to say the quotient of the power output and the power supplied to the generator, or the refrigeration factor of the refrigerator, that is to say the quotient of the power received in the evaporator and the power supplied to the generator, is substantially increased, particularly if the temperature of one or more of the heat sources and/or the (various) output temperatures vary considerably. For this purpose the flow of refrigerant is regulated in such a manner that the difference ($\Delta t$) between $\Delta t_w (=t_1-t_4)$ and $\Delta t_k (=t_2-t_3)$ preferably amounts to about 0, and in particular at most amounts to plus or minus 10 K.

In the present description the expression "heat source" is to be understood to mean any medium from which heat can be taken, for example air, earth, water (either flowing or still), foodstuffs.

In order to enable the heat pump or refrigerator to work in a stable manner, the flow of refrigerant is preferably also regulated on the basis of the difference ($\Delta t$) between the temperature ($t_b$) of the heat source and the temperature ($t_o$) of the evaporator. It is preferable to apply the four-temperature control in cascade with regulation on the basis of $t_b-t_o$, so that the desired value of the latter is optimized. When the heat source is air and the evaporator temperature is lower than 0° C., it is advantageous for the moment of the commencement of the thawing of the frost accumulating on the evaporator also to be determined on the basis of $\Delta t$ or $\Delta t$, as the case may be.

The invention also relates to an absorption heat pump or refrigerator which consists at least of a refrigerant circuit and a refrigerant-containing solution circuit, with a generator for evaporating refrigerant from the solution with the supply of heat at a relatively high temperature, a condenser for condensing refrigerant and giving up heat at an intermediate temperature level, an evaporator for evaporating refrigerant with the absorption of heat from a relatively cold heat source, a heat exchanger for transferring heat from the liquid passing out of the condenser to the refrigerant vapour and liquid coming from the evaporator, an absorber for absorbing refrigerant vapour into the solution with the giving-up of heat at an intermediate temperature level, and means for circulating the solution or maintaining the pressure, which heat pump or refrigerator is characterized in that at the inlets and outlets respectively of the heat exchanger there are disposed, in or on the four pipes or members connected thereto, temperature sensors which are connected via a regulating means to a regulable valve (throttle means), whereby the supply of the refrigerant to the evaporator is controlled.

The invention further relates to an apparatus of the above-described type, in which there are disposed both at the site of the heat source and in the evaporator, or close thereto, temperature sensors which are connected via a regulating means to the regulable valve controlling the supply to the evaporator. This regulation with the aid of temperature sensors at the site of the heat source and in or near the evaporator is preferably connected in cascade with the regulation with the aid of four temperature sensors at the site of the inlets and outlets of the heat exchanger, the latter regulation optimizing the desired value of the former.

For an effective action of the four-temperature control according to the invention it is desirable for the liquid side of the heat exchanger to be continuously completely filled with liquid.

The invention is explained more fully below with reference to the accompanying drawings in which:

FIGS. 3a and 3b are block diagrams illustrating two different control procedures according to the invention.

DESCRIPTION OF PREFERRED EMBODIMENTS

Figure 1:
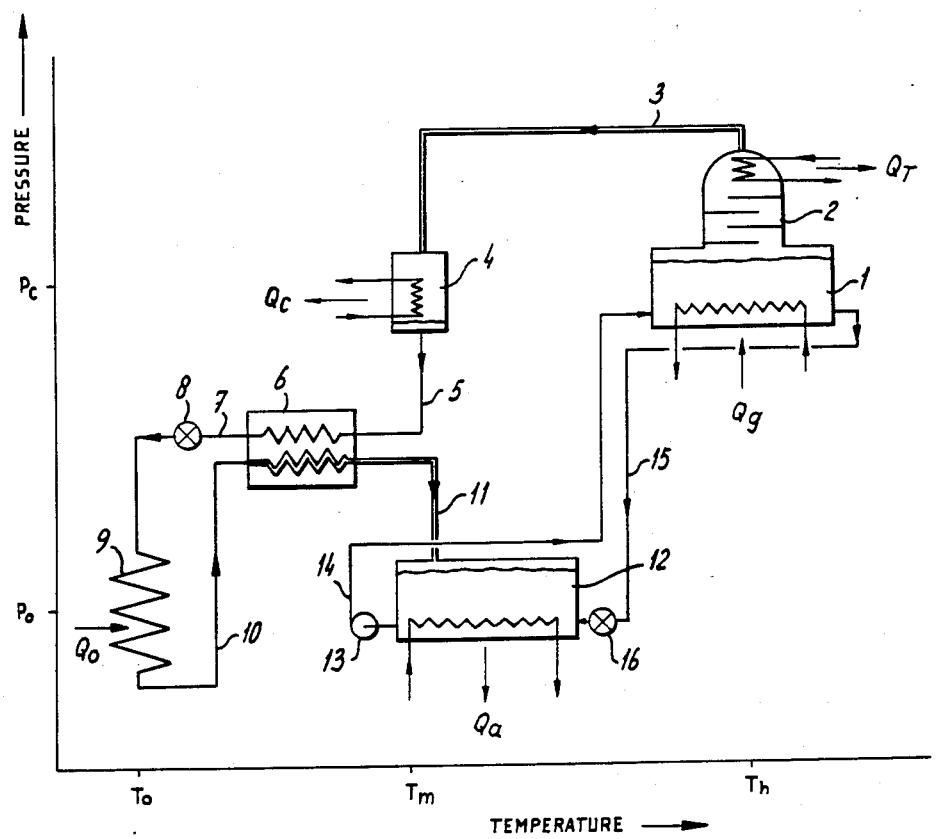
FIG. 1 shows schematically a continuously acting absorption heat pump which can be operated in accordance with the invention.

The components are as far far as possible set out in a p-T diagram, which clearly shows where the pressure or temperature is relatively high or low. In a generator 1 refrigerant is driven out of the solution of refrigerant and solvent by the supply of heat $Q_g$. The generator 1 may be provided with a rectifier 2 in which the refrigerant vapour is freed from at least a part of the likewise evaporated solvent and the heat $Q_T$ released is discharged. The refrigerant vapour is passed via a pipe 3 to a condenser 4, in which the vapour condenses and the heat $Q_C$ is discharged. The liquid coming from the condenser 4 is passed via a pipe 5 to a heat exchanger 6, and the cooled liquid leaves the heat exchanger 6 via a pipe 7. The heat exchanger 6 is also known as an afterevaporator, liquid cooler, or aftercooler. In the pipe 7 a throttle means 8 for an evaporator 9 is disposed. The refrigerant liquid at least partly evaporates in the evaporator 9 and takes up heat from the heat source ($Q_o$). The liquid-vapour mixture leaves the evaporator 9 via a pipe 10 and passes into the heat exchanger 6, which is connected by a pipe 11 to an absorber 12. In this absorber the refrigerant is absorbed, with the giving-up of heat $Q_a$, into the solution, which is supplied via a pipe 15 from the generator 1. A throttle means 16 is disposed in the pipe 15. With the aid of a solution pump 13 the solution is passed via a pipe 14 to the generator 1.

Figure 2:
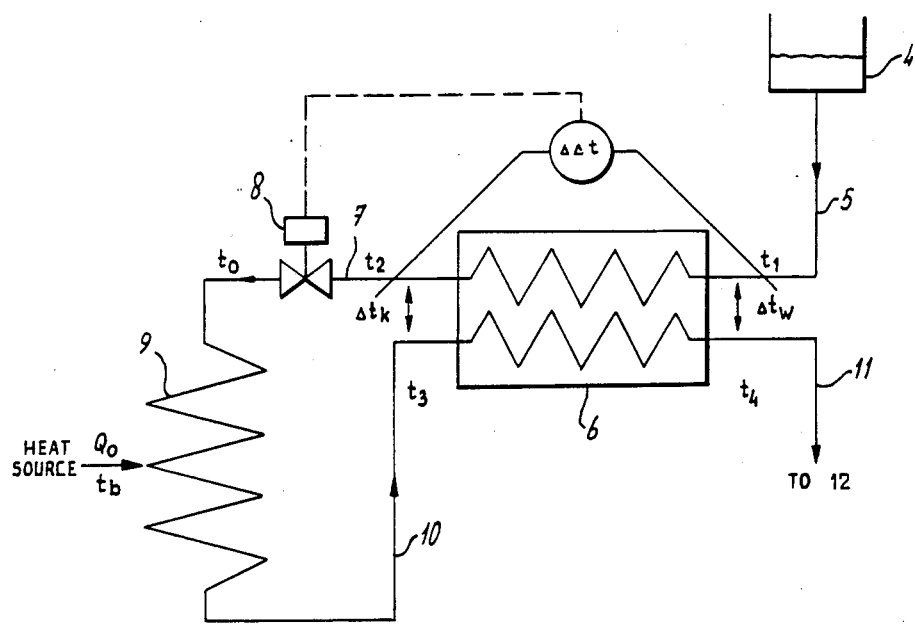
FIG. 2 is a partial enlarged view of the apparatus shown in FIG. 1.

FIG. 2 shows on a larger scale a part of the apparatus shown in FIG. 1. In this Figure, $\Delta t_k$ and $\Delta t_w$ represent the differences between $t_2$ and $t_3$ and between $t_1$ and $t_4$ respectively. $\Delta t$, the difference between $\Delta t_w$ and $\Delta t_k$, suprisingly is an extremely suitable signal for optimum regulation of the evaporator.

FIGS. 3a and 3b are block diagrams of the regulation procedures which can be applied in accordance with the invention. The symbols used here, insofar as they have not previously been explained, have the following meanings:

r value adjusted.

ε difference between value measured and value adjusted.

The apparatus according to the invention can be operated with pairs of substances customarily used in apparatus of this kind, for example ammonia and water. The refrigerant need not be completely pure and may still contain a small amount of solvent. According to the present invention the evaporator used is a continuous-flow evaporator, for example a coil evaporator, from which any unevaporated refrigerant is entrained by the current of vapour.

The application of the principle according to the invention is not restricted to the apparatus shown in FIG. 1, and it can be applied in an absorption heat pump or absorption refrigerator of any type.

I claim:

1. Method of operating an absorption heat pump or refrigerator, consisting at least of a refrigerant circuit and a refrigerant-containing soluton circuit, with a generator for evaporating refrigerant from the solution with the supply of relatively high-temperature heat, a condenser for condensing refrigerant and giving up heat at an intermediate temperature level, an evaporator for evaporating refrigerant with the absorption of heat from a relatively cold heat source, a heat exchanger for transferring heat from the liquid passing out of the condenser to the refrigerant vapour and liquid coming from the evaporator, an absorber for absorbing refrigerant vapour into the solution with the giving-up of heat at an intermediate temperature level, and means for circulating the solution or maintaining the pressure, characterized in that the delivery of refrigerant is regulated in such a manner that the temperature differential $\Delta t_w$ between the liquid entering the heat exchanger on the condenser side ($t_1$) and the liquid and vapour leaving the heat exchanger on the absorber side ($t_4$) substantially coincides with the temperature differential $\Delta t_k$ between the liquid passing out of the heat exchanger on the evaporator side ($t_2$) and the liquid and vapour entering the heat exchanger on the evaporator side ($t_3$).

2. Method according to claim 1, characterized in that the delivery of refrigerant is regulated in such a manner that the difference ($\Delta t$) between $t_1-t_4$ and $t_2-t_3$ amounts to approximately 0 and at most to plus or minus 10° K.

3. Method according to claim 1 or 2, characterized in that the regulation of the delivery of refrigerant is also made dependent on the difference ($\Delta t$) between the temperature of the heat source ($t_b$) and that of the evaporator ($t_o$).

4. Method according to claims 1 or 2, characterized in that the moment of the commencement of the thawing of frost accumulated on the evaporator is effected in response to one of the quantities $\Delta t = (t_b - t_o)$ or $\Delta t = (t_1 - t_4) - (t_2 - t_3)$.

5. Method according to claims 1 or 2, characterized in that the liquid side of the heat exchanger is kept continuously completely filled with liquid.

6. Absorption heat pump or refrigerant which consists at least of a refrigerant circuit and a refrigerant-containing solution circuit, with a generator for evaporating refrigerant from the solution with the supply of heat at a relatively high temperature, a condenser for condensing refrigerant and giving up heat at an intermediate level, an evaporator for evaporating refrigerant with the absorption of heat from a relatively cold heat source, a heat exchanger having first inlet and outlet means for conducting liquid from said condenser, and second inlet and outlet means for conducting refrigerant vapor and liquid from the evaporator for transferring heat from the liquid passing out of the condenser to the refrigerant vapor and liquid coming from the evaporator, an absorber for absorbing refrigerant vapor into the solution with the giving-up of heat at an intermediate temperature level, and means for circulating the solution or maintaining the pressure, characterized in that first temperature sensor means are provided at said first and second heat exchanger inlets and outlets, respectively, with flow regulating means responsive to said temperature sensor means for regulating the supply of the refrigerant to the evaporator.

7. Apparatus according to claim 6, characterized in that second temperature sensor means are provided at the site of the heat source and at the evaporator and that said regulating means is also responsive to said last-named second temperature sensor means.

8. Apparatus according to claim 6 or 7, characterized in that the regulation of the supply of said refrigerant to the evaporator in response to said second temperature sensor means at the site of the heat source and at the evaporator is effected in cascade with the regulation of the supply of said refrigerant to the evaporator in response to said first sensor means.

9. Apparatus according to claim 6 characterized in that said flow regulating means is responsive to $\Delta t = (t_1 - t_4) - (t_2 - t_3)$ where $t_1$ and $t_2$ are the temperatures measured by temperature sensors at said heat exchanger first inlet and outlet means, and $t_3$ and $t_4$ are the temperatures measured by temperature sensor means at said heat exchanger second inlet and outlet means, respectively.

10. Apparatus according to claim 7 characterized in that said flow regulating means is also responsive to $\Delta t = t_b - t_o$ where $t_b$ and $t_o$ are the temperatures measured by said second temperature sensor means at said heat source and at said evaporator, respectively.

* * * * *

UNITED STATES PATENT AND TRADEMARK OFFICE
CERTIFICATE OF CORRECTION

PATENT NO. : 4,691,525
DATED : 09/08/87
INVENTOR(S) : Gelderloos

It is certified that error appears in the above-identified patent and that said Letters Patent is hereby corrected as shown below:

<u>Col. 1, line 29,</u> "condensers" should read --condenser--;

<u>Col. 1, line 68,</u> "($\triangle$t)" should read --($\triangle\triangle$t)--;

<u>Col. 2, line 19,</u> "or$\triangle$t," should read --or$\triangle\triangle$t,--;

<u>Col. 3, line 33,</u> "$\triangle$t" should read --$\triangle\triangle$t--;

<u>Col. 4, line 16,</u> "($\triangle$t)" should read --($\triangle\triangle$t)--;

<u>Col. 4, line 27,</u> "$\triangle$t" should read --$\triangle\triangle$t--; and <u>Col. 4, line 68,</u> "$\triangle$t" should read --$\triangle\triangle$t--.

Signed and Sealed this

Ninth Day of February, 1988

*Attest:*

DONALD J. QUIGG

*Attesting Officer*      *Commissioner of Patents and Trademarks*